United States Patent
Uchikoshi et al.

(10) Patent No.: US 12,522,073 B2
(45) Date of Patent: Jan. 13, 2026

(54) DISPLAY CONTROL DEVICE, DISPLAY CONTROL METHOD, AND RECORDING MEDIUM

(71) Applicant: Panasonic Intellectual Property Management Co., Ltd., Osaka (JP)

(72) Inventors: Tadahiro Uchikoshi, Kanagawa (JP); Masahito Oishi, Kanagawa (JP); Kazuki Onishi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 406 days.

(21) Appl. No.: 18/225,535

(22) Filed: Jul. 24, 2023

(65) Prior Publication Data

US 2024/0051392 A1     Feb. 15, 2024

(30) Foreign Application Priority Data

Aug. 15, 2022   (JP) .................. 2022-129180

(51) Int. Cl.
*B60K 35/00*   (2024.01)
*B60K 35/22*   (2024.01)
(Continued)

(52) U.S. Cl.
CPC .............. *B60K 35/85* (2024.01); *B60K 35/22* (2024.01); *B60K 35/29* (2024.01); *B60K 35/81* (2024.01); *B60K 2360/182* (2024.01)

(58) Field of Classification Search
CPC ........ B60K 35/00; B60K 35/29; B60K 35/81; B60K 2360/182; B60K 2360/166;
(Continued)

(56) References Cited

U.S. PATENT DOCUMENTS

2020/0143167 A1*   5/2020   Hayashi ................ G08G 1/017

FOREIGN PATENT DOCUMENTS

JP      2007-304836      11/2007
JP      2016-141283      8/2016
(Continued)

OTHER PUBLICATIONS

Office Action from Japan Patent Office (JPO) in Japanese Patent Appl. No. 2022-129180, dated Jun. 25, 2024, together with an English language translation.

*Primary Examiner* — Yuen Wong
(74) *Attorney, Agent, or Firm* — Greenblum & Bernstein, P.L.C.

(57) ABSTRACT

A display control device includes an analyzer, a determination unit, and a display controller. The analyzer obtains and analyzes first display information and second display information to be displayed on at least one display. The determination unit determines the sameness of the first display information and the second display information according to the results of analysis by the analyzer. The display controller controls the at least one display. In addition, a second external device is different from a first external device. When the determination unit determines that the first display information and the second display information are identical, the display controller causes a predetermined display of the at least one display to display one display information item based on the first display information and the second display information.

13 Claims, 6 Drawing Sheets

(51) Int. Cl.
*B60K 35/29* (2024.01)
*B60K 35/81* (2024.01)
*B60K 35/85* (2024.01)

(58) Field of Classification Search
CPC ........ B60K 2360/167; B60K 2360/178; B60K 2360/1868; B60K 2360/21; B60K 2360/589; B60K 35/22; B60K 35/85; G01C 21/3492; G01C 21/3691; G08G 1/096716; G08G 1/096783; G08G 1/096791; G08G 1/096827; G08G 1/096844; G08G 1/0969; G08G 1/143; G08G 1/162; G08G 1/166
See application file for complete search history.

(56) References Cited

FOREIGN PATENT DOCUMENTS

| | | |
|---|---|---|
| JP | 6687169 | 4/2020 |
| WO | 2014/024258 | 2/2014 |
| WO | 2019/159494 | 8/2019 |

* cited by examiner

Display information

{"command":add_view",
 "type"MEDIA
 "text":"XXXXX"
 "image":xxxxx.png

DISPLAY CONTROL DEVICE, DISPLAY CONTROL METHOD, AND RECORDING MEDIUM

CROSS REFERENCE TO RELATED APPLICATION

The present application is based on and claims priority of Japanese Patent Application No. 2022-129180 filed on Aug. 15, 2022.

FIELD

The present disclosure relates to a display control device, a display control method, and a recording medium.

BACKGROUND

Patent Literature 1 discloses an information generation device that displays, on a screen, sensor information items received from sensors. The information generation device includes a determination unit and a display information generator. On the basis of the sensor information items obtained by a sensor information obtainer, the determination unit determines whether each of the sensors has detected an object present in the same predetermined area. When the result of the determination by the determination unit is affirmative and a predetermined condition for determining whether the objects detected by the sensors are identical is not satisfied, the display information generator generates first display information for individually displaying the objects detected by the sensors. When the result of the determination is affirmative and the predetermined condition is satisfied, the display information generator generates second display information for displaying the objects detected by the sensors in a manner of displaying different from a manner of displaying of the first display information.

CITATION LIST

Patent Literature

PTL 1: Japanese Patent No. 6687169

SUMMARY

However, the information generation device according to PTL1 can be improved upon.

A display control device, a display control method, and a recording medium according to some aspects of the present disclosure are capable of improving upon the above related art.

A display control device according to one aspect of the present disclosure includes an analyzer that obtains and analyzes first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display, a determination unit that determines the sameness of the first display information and the second display information according to the results of analysis by the analyzer, and a display controller that controls the at least one display. The second external device is different from the first external device, and when the determination unit determines that the first display information and the second display information are identical, the display controller causes a predetermined display of the at least one display to display one display information item based on the first display information and the second display information.

A display control method according to another aspect of the present disclosure includes obtaining and analyzing first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display, the second external device being different from the first external device, determining the sameness of the first display information and the second display information according to the results of analysis, controlling the at least one display, and causing a predetermined display of the at least one display to display one display information item based on the first display information and the second display information, the causing being performed when the first display information and the second display information are determined to be identical.

A recording medium according to still another aspect of the present disclosure is a non-transitory computer-readable recording medium having recorded thereon a program for causing a computer to perform the display control method.

A display control device, a display control method, and a recording medium according to some aspects of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
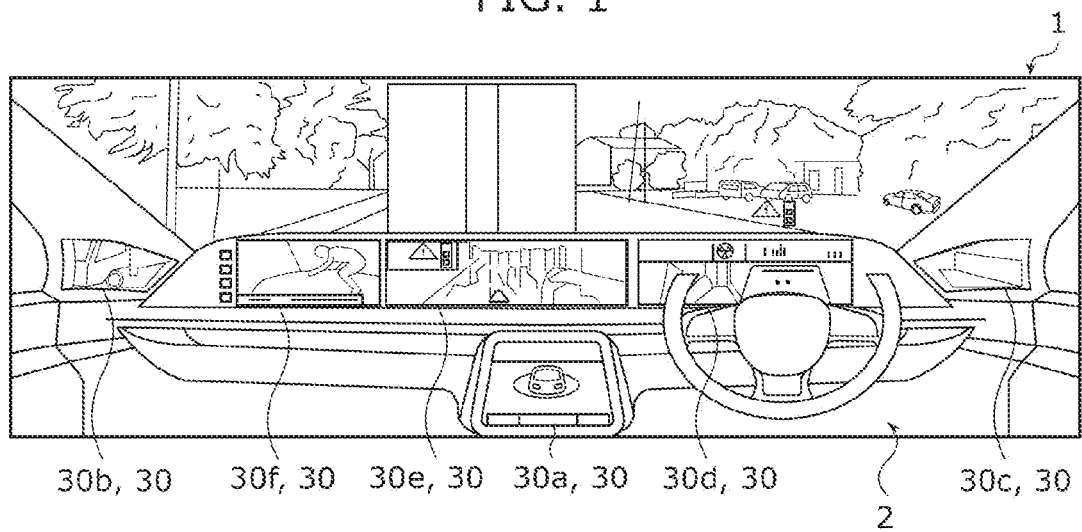
FIG. 1 is a schematic view of an in-vehicle system mounted on a vehicle.

It should be noted that the embodiment described below shows general or specific examples of the present disclosure.

The numerical values, shapes, materials, structural elements, positions and connections of the structural elements, steps, order of the steps, and other descriptions provided below in the embodiment are mere examples and are not intended to limit the present disclosure. In addition, the structural elements not included in the independent claims, among the structural elements in the embodiment below are described as optional structural elements.

In addition, the drawings are schematic views and are not necessarily precisely drawn. In the drawings, identical structural elements are assigned the same reference symbol.

The embodiment is concretely described below with reference to the drawings.

EMBODIMENT

[Configuration and Function]

In-vehicle system 1 according to an embodiment is described with reference to FIGS. 1 to 5.

Figure 2:
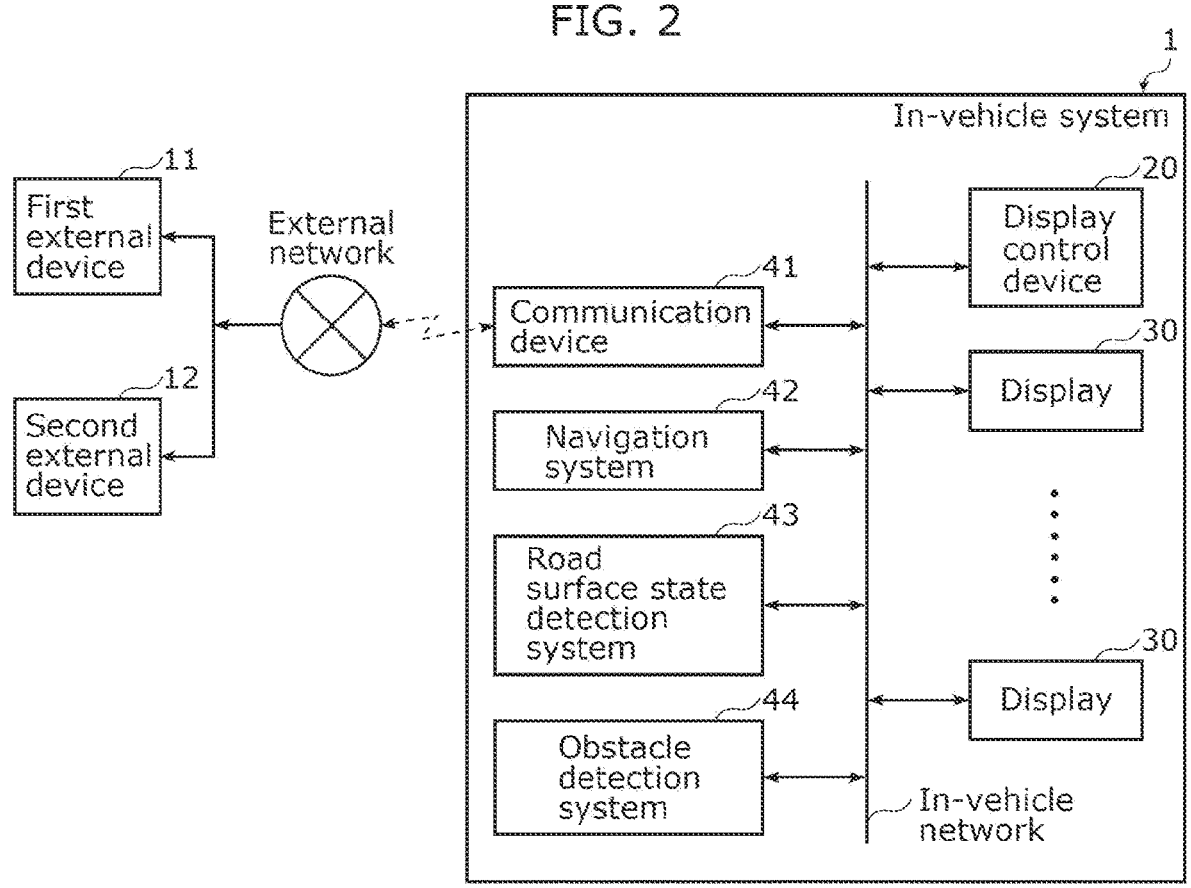
FIG. 2 is a block diagram of an in-vehicle system according to an embodiment.
Figure 3:
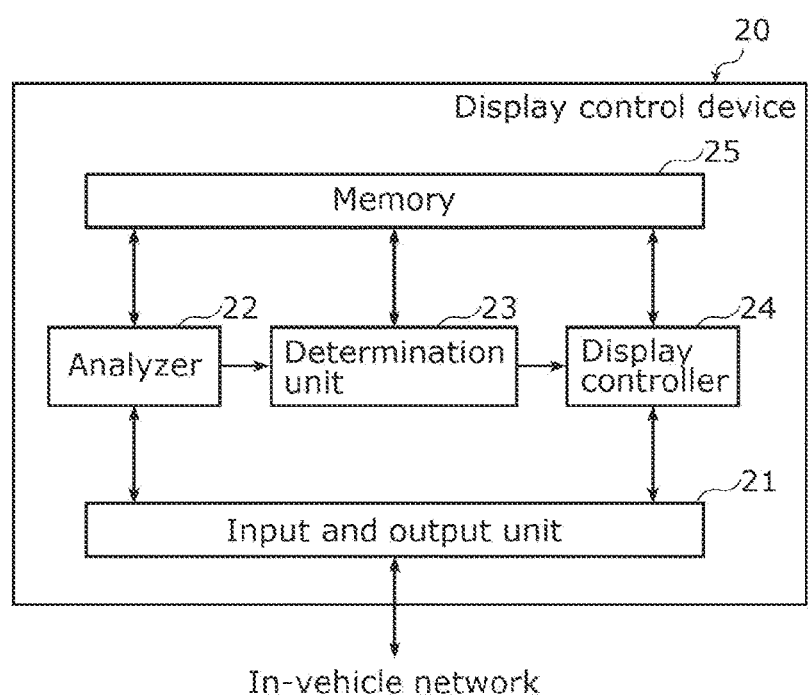
FIG. 3 is a block diagram of a display control device according to the embodiment.
Figures 4A, 4B:
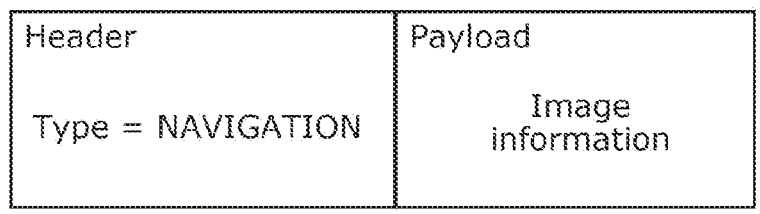
FIG. 4A illustrates a data structure of traffic information.
FIG. 4B illustrates a structure of the traffic information.
Figure 5:
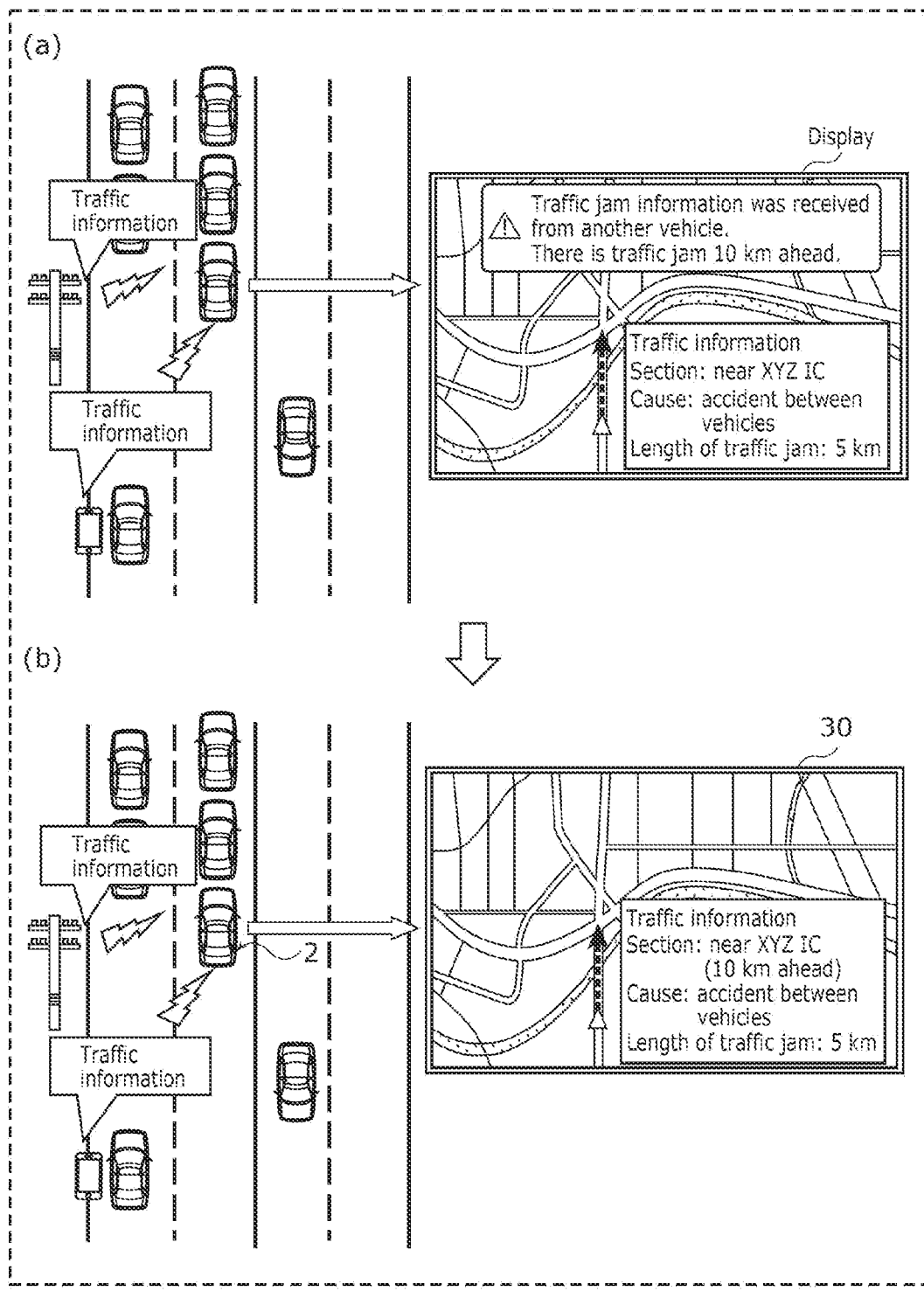
FIG. 5 illustrates a manner of displaying by a display when the display control device according to the embodiment is not used and a manner of displaying by the display when the display control device according to the embodiment is used.

FIG. 1 is a schematic view of in-vehicle system 1 mounted on vehicle 2. FIG. 2 is a block diagram of in-vehicle system 1 according to the embodiment. FIG. 3 is a block diagram of display control device 20 according to the embodiment. FIG. 4A illustrates a data structure of traffic information. FIG. 4B illustrates a structure of the traffic information. FIG. 5 illustrates a manner of displaying by display 30 when display control device 20 according to the embodiment is not used and a manner of displaying by display 30 when display control device 20 according to the embodiment is used. (a) in FIG. 5 illustrates a case in which display 30 is separately displaying identical display information items by using a conventional technique. (b) in FIG. 5 illustrates a case in which predetermined display 30 is displaying one display information item into which the identical display information items are organized by display control device 20 according to the embodiment.

As illustrated in FIG. 1, in-vehicle system 1 can display videos on the display screens of one or more displays 30. In in-vehicle system 1, the videos displayed on the respective display screens of one or more displays 30 can be set automatically or manually by an occupant.

In addition, in-vehicle system 1 is used in, for example, vehicle 2 in which at least one display 30 is disposed. Thus, in the embodiment, the videos are images displayed on the basis of an application. For instance, the videos include information, such as vehicle instrument information, the operation status of each in-vehicle device, navigation information, a captured image, and nearby vehicle information. Vehicle instruments include, for example, a speedometer, a direction indicator lamp, an idiot light, an odometer, a shift position indicator, a fuel gauge, and a water temperature gauge. In-vehicle devices include, for example, an acoustic device, an in-vehicle lighting device, and a seat device. The navigation information is provided for informing a driver of, for example, the present location and route guidance to a destination when the driver is driving vehicle 2. The captured image is an image of at least a portion of the surroundings of vehicle 2 or at least a portion of the interior of the occupant compartment of vehicle 2, captured by an image capturing device mounted on vehicle 2. The nearby vehicle information indicates, for example, the presence or absence of another vehicle present around vehicle 2, the number of vehicles present around vehicle 2, the traveling speed of another vehicle, and the distance from vehicle 2 to another vehicle.

Specifically, as illustrated in FIGS. 2 and 3, in-vehicle system 1 includes communication device 41, display control device 20, and displays 30.

[Communication Device 41]

Communication device 41 is a communication interface wirelessly communicable with first external device 11 and second external device 12 via an external network of vehicle 2.

Here, first external device 11 is communication device 41 outside the vehicle and, for example, an outdoor infrastructure system, a terminal such as the smartphone of a person outside the vehicle, and another vehicle 2 that is a vehicle other than vehicle 2. Here, second external device 12 is communication device 41 outside the vehicle and is different from first external device 11. Second external device 12 is, for example, an outdoor infrastructure system, a terminal such as the smartphone of a person outside the vehicle, and another vehicle 2 that is a vehicle other than vehicle 2.

Communication device 41 can obtain first display information that is traffic information transmitted by first external device 11 and information to be displayed on one of at least one display 30. Communication device 41 can obtain second display information that is traffic information transmitted by second external device 12 and information to be displayed on one of at least one display 30. Every time communication device 41 obtains the first display information and the second display information, communication device 41 outputs the obtained first display information and second display information to display control device 20. In an example in the embodiment, communication device 41 wirelessly communicates with first external device 11 and second external device 12 and obtains display information items. However, communication device 41 may obtain a display information item from still another external device. It should be noted that in the embodiment, the first display information and the second display information may be collectively referred to as display information items.

Here, the first display information is traffic information obtained by first external device 11 by using, for example, a sensor. The second display information is traffic information obtained by second external device 12 by using, for example, a sensor. The traffic information is information regarding the safety and traveling of vehicle 2 and indicates, for example, information on an accident occurred on a road, traffic jam information, information indicating the presence of an obstacle, and traffic regulation information. In addition, the traffic information may include information on a store in the vicinity of vehicle 2. The formats of the traffic information include, for example, text information, image information, and a draw command.

[Display Control Device 20]

Display control device 20 is disposed in vehicle 2 including at least one display 30 and can control at least one display 30 by adjusting the manner of displaying a video showing, for example, display information to be displayed on at least one display 30.

Specifically, display control device 20 includes input and output unit 21, analyzer 22, determination unit 23, display controller 24, and memory 25.

Input and output unit 21 is connected to an in-vehicle network and is communicable with, for example, communication device 41 and at least one display 30. Every time communication device 41 obtains the first display information and the second display information, input and output unit 21 obtains the first display information and the second display information from communication device 41.

Although details are described later, input and output unit 21 can also output a video drawn by display controller 24 to display 30.

Analyzer 22 obtains, from input and output unit 21, the first display information transmitted by first external device 11 and the Analyzer 22 analyzes the obtained first display information and second display information.

Specifically, (1) as illustrated in FIG. 4A, analyzer 22 may be able to extract words (characters) from each of the first display information and the second display information by analyzing the first display information and the second display information.

(2) As illustrated in FIG. 4A, analyzer 22 may be able to extract at least one of a graphic or a character string from each of the first display information and the second display information by analyzing the first display information and the second display information.

(3) As illustrated in FIG. 4B, by analyzing the first display information and the second display information, analyzer 22 may be able to extract the provider of the first display information described in the header of the first display information and the provider of the second display information described in the header of the second display information.

(4) By analyzing the first display information and the second display information, analyzer 22 may be able to extract the time point at which the first display information was generated and the time point at which the second display information was generated.

(5) Analyzer 22 may extract a display location to display the first display information on at least one display 30 and a display location to display the second display information on at least one display 30, by analyzing the first display information and the second display information. For one display 30, the display location indicates a display position within a display screen. For two or more displays 30, the display location further indicates display 30 on which the display information is to be displayed, among two or more displays 30.

(6) When the first display information includes text information and the second display information includes image information, analyzer 22 may extract words by analyzing the first display information and extract a character string by analyzing the second display information.

In addition, analyzer 22 may perform the processing by combining at least two of (1) to (6) described above.

Analyzer 22 may analyze the first display information and the second display information by using an analysis algorithm of artificial intelligence and perform (1) to (6) described above. For instance, analyzer 22 may perform determination in accordance with a learning model obtained by performing machine learning on past sample data by using the analysis algorithm. The past sample data (display information) is training data obtained by learning the results of analyzing display information items. Learning by the analysis algorithm may be performed using one or more known statistical classification techniques. It should be noted that analyzer 22 may update the analysis algorithm by receiving feedback on the analysis results.

After analyzing the first display information and the second display information, analyzer 22 generates tags for the analyzed first display information and second display information. The tags are marks each appropriately indicating the content of the display information item. Analyzer 22 stores, in memory 25, the analysis results and the generated tags which are associated with the display information items.

Analyzer 22 outputs the display information items, the analysis results, and the tags to determination unit 23.

Determination unit 23 determines the sameness of the first display information and the second display information according to at least the results of analysis by analyzer 22. Here, the sameness includes substantial sameness as well as exact sameness. In addition, when a predetermined percent or more of the first display information and the second display information are identical, determination unit 23 may determine that the first display information and the second display information are identical.

Specifically, when the results of analysis show that the first display information and the second display information are text information items, determination unit 23 may determine, according to the results of analysis by analyzer 22, the sameness of words extracted from the first display information and words extracted from the second display information.

When the results of analysis show that the first display information and the second display information are image information items, determination unit 23 may determine, according to the results of analysis by analyzer 22, the sameness of at least one of a graphic or a character string extracted from the first display information and at least one of a graphic or a character string extracted from the second display information.

Determination unit 23 may also determine the sameness of the provider of the first display information and the provider of the second display information, according to the results obtained by analyzer 22 analyzing the providers of the display information items.

Determination unit 23 may also determine the sameness of the time point at which the first display information was generated and the time point at which the second display information was generated, according to the results obtained by analyzer 22 analyzing the time points at which the display information items were generated.

According to the results obtained by analyzer 22 analyzing the display locations of the display information items on at least one display 30, determination unit 23 may also determine the sameness of the display location to display the first display information and the display location to display the second display information, the display locations being display locations on at least one display 30.

By using a determination algorithm of the artificial intelligence, determination unit 23 may also determine the sameness of the first display information and the second display information according to the results of analysis by analyzer 22. For instance, by using the determination algorithm, determination unit 23 may determine the sameness in accordance with a learning model obtained by performing machine learning on past sample data. The past sample data (determination results) is training data which has learned determination results for analysis results. Learning by the determination algorithm may be performed by using one or more known statistical classification techniques. It should be noted that determination unit 23 may update the determination algorithm by receiving feedback on the determination results.

Determination unit 23 stores the determination result in memory 25. Determination unit 23 outputs, to display controller 24, the determination result, the first display information, the second display information, the tag of the first display information, and the tag of the second display information.

When determination unit 23 determines that the first display information and the second display information are identical, display controller 24 causes predetermined display 30 of at least one display to display one display information item based on the first display information and the second display information. Predetermined display 30 is one of display devices, such as car navigation system 30a, an electron mirror system functioning as left sideview mirror 30b and right sideview mirror 30c, multi-information displays 30d, 30e, and 30f, which are illustrated in FIG. 1 and described later. In addition, display 30 without the word predetermined is a generic term of one of the display devices. Thus, although display 30 and predetermined display 30 are assigned the same reference symbol, it does not mean that display 30 and predetermined display 30 are completely physically the same.

Specifically, display controller 24 generates a video obtained by performing drawing processing on the one display information item based on the first display information and the second display information. In the drawing processing, for example, brightness (lightness), contrast, a gamma value, and a color tone are adjusted. When performing the drawing processing, display controller 24 stores, in memory 25, the first display information, the second display information, the tag of the first display information, and the tag of the second display information. Display controller 24 causes display 30 to display the generated video showing the one display information item.

As illustrated in (b) in FIG. 5, when determination unit 23 determines that the first display information and the second display information are identical, display controller 24 may organize the first display information and the second display information into one display information item and cause predetermined display 30 to display the one display information item. That is, display controller 24 may generate the video by performing the drawing processing on the one display information item and cause predetermined display 30 to display the generated video. This can suppress at least one display 30 from displaying each of identical display information items.

As illustrated in FIGS. 2 and 3, for example, the results of analysis by analyzer 22 and the tags of the display information items are stored in memory 25. Memory 25 is, for example, random access memory (RAM) and read only memory (ROM).

In-vehicle system 1 may also include navigation system 42, road surface state detection system 43, and obstacle detection system 44. Navigation system 42, road surface state detection system 43, and obstacle detection system 44 are connected to the in-vehicle network.

Navigation system 42 identifies the present location and traveling direction of vehicle 2 on map data by analyzing a global positioning system (GPS) signal and provides route guidance from the present location to a destination when the destination and a route to the destination are registered. Navigation system 42 can cause display 30 to display the present location, the traveling direction, and the route guidance.

Road surface state detection system 43 detects the state of the road surface on which vehicle 2 is traveling, by using a sensor including a light source that emits a measuring beam and a photodetector. Road surface state detection system 43 can cause display 30 to display the detected road surface state.

Obstacle detection system 44 is a system for detecting an obstacle present around vehicle 2 by using a sensor such as a lidar sensor or a sonar unit, to avoid a collision with the obstacle. Obstacle detection system 44 can cause display 30 to display the distance to the detected obstacle.

[Display 30]

Displays 30 include a personal computer (PC) equipped with, for example, a liquid crystal display, a portable terminal such as a smartphone, a car navigation system mounted on vehicle 2, an electron mirror system, and multi-information displays.

As examples of displays 30, FIG. 1 illustrates car navigation system 30a disposed in the middle of the breadth of the vehicle, the electron mirror system functioning as left sideview mirror 30b and right sideview mirror 30c, and multi-information displays 30d, 30e, and 30f. Displays 30 are aligned to enable an occupant of vehicle 2 to see displays 30 all at once.

As illustrated in FIG. 1, when displays 30 are aligned in vehicle 2, in-vehicle system 1 associates displays 30 with one another and controls displays 30. Thus, displays 30 can display the same video and individually display different videos.

Displays 30 can display video on the display screen. Displays are display panels such as liquid crystal panels or organic electro luminescence (EL) panels. Displays 30 display, for example, a map for car navigation, the menu images of various in-vehicle devices, or a graphical user interface (GUI) for operating a video such as retrieval images.

[Processing Operation]

An operation example in display control device 20, a display control method, and a program according to the embodiment is described below. The operation example is described with reference to FIG. 6.

Figure 6:
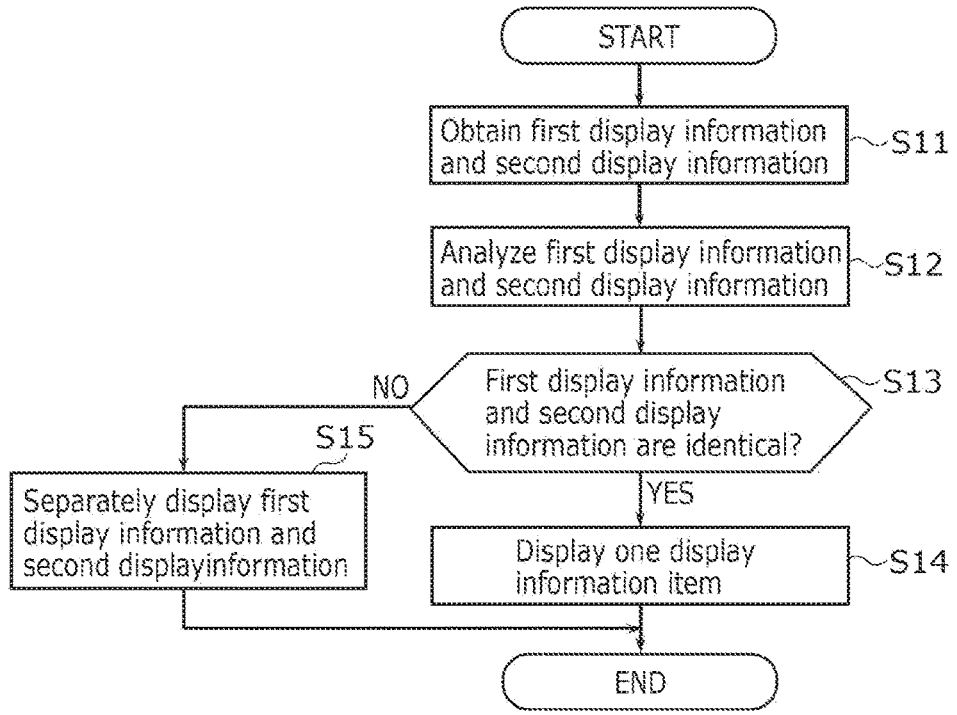
FIG. 6 is a flowchart illustrating an example of operation of the display control device according to the embodiment.

FIG. 6 is a flowchart illustrating an example of operation of display control device 20 according to the embodiment.

Input and output unit 21 of display control device 20 obtains the first display information from first external device 11 via communication device 41 and obtains the second display information from second external device 12 via communication device 41 (S11).

Analyzer 22 obtains, from input and output unit 21, the first display information transmitted by first external device 11 and the Analyzer 22 analyzes the obtained first display information and second display information (S12).

Specifically, (1) when the first display information and the second display information are text information items, as illustrated in FIG. 4A, analyzer 22 may extract words from each of the first display information and the second display information by analyzing the first display information and the second display information. For instance, when a text information item indicates that "watch for the pedestrian ahead", analyzer 22 may extract the words "ahead", "pedestrian", and "watch" by analyzing the text information item.

In another example, (2) when the first display information and the second display information are image information items, as illustrated in FIG. 4A, analyzer 22 may extract at least one of a graphic or a character string from each of the first display information and the second display information by analyzing the first display information and the second display information. For instance, when an image information item includes at least one of a graphic or a character string, analyzer 22 may perform image analysis for the image information item and extract the at least one of the graphic or the character string. The graphic is, for example, a traffic sign and a symbol included in the image information item. In addition, the character string includes characters included in the image information item and indicates, for example, "stop" or "slow down".

In still another example, (3) analyzer 22 may extract the provider of the first display information and the provider of the second display information by analyzing the first display information and the second display information. For instance, a parking lot management system sometimes transmits parking lot vacancy information to vehicle 2 via first external device 11 or second external device 12. In this case, as illustrated in FIG. 4B, by analyzing the headers, analyzer 22 may extract the provider of the first display information described in the header of the first display information and the provider of the second display information described in the header of the second display information.

In still another example, (4) analyzer 22 may extract the time point at which the first display information was generated and the time point at which the second display information was generated, by analyzing the first display information and the second display information. For instance, when the traveling speed of the vehicle exceeds the legal speed, the first display information and the second display information are simultaneously generated. When the first display information and the second display information are simultaneously generated, the first display information and the second display information are assumed to be identical. Thus, by analyzing the first display information and the second display information, analyzer 22 may extract the time point at which the first display information was generated and the time point at which the second display information was generated.

In still another example, (5) by analyzing the first display information and the second display information, analyzer 22 may extract a display location to display the first display information on at least one display 30 and a display location to display the second display information on at least one display 30. For instance, a message of high-level of urgency, such as caution for pedestrian, may be displayed on display 30 that easily catch driver's eyes. In a case where two or more displays 30 are mounted on vehicle 2, when the first display information and the second display information are displayed on same display 30, the first display information and the second display information are assumed to be identical. In a case where only one display 30 is mounted on vehicle 2, when the first display information and the second display information are displayed at the same display location on the screen of display 30, the first display information and the second display information are assumed to be identical. Thus, by analyzing the first display information and the second display information, analyzer 22 may extract the display locations of the first display information and the second display information.

It should be noted that, for instance, (6) when the first display information includes text information and the second display information includes image information, analyzer 22 may extract words by analyzing the first display information and extract a character string by analyzing the second display information.

In addition, analyzer 22 may perform the processing by combining at least two of (1) to (6) described above.

After analyzing the first display information and the second display information, analyzer 22 generates tags for the analyzed first display information and second display information. Analyzer 22 stores, in memory 25, analysis results and the generated tags. In addition, analyzer 22 outputs, to determination unit 23, the first display information, the second display information, the analysis results, and the tags.

Determination unit 23 determines the sameness of the first display information and the second display information according to at least the results of analysis by analyzer 22 (S13). Determination unit 23 stores a determination result in memory 25. Determination unit 23 also outputs, to display controller 24, the determination result, the first display information, and the second display information.

Specifically, when the first display information and the second display information are text information items, determination unit 23 may determine the sameness of words extracted from the first display information and words extracted from the second display information, according to the results of analysis by analyzer 22. For instance, when analyzer 22 extracts the words "ahead", "pedestrian", "watch" from the text information items, if the words extracted from the first display information item are exactly the same as the words extracted from the second display information item or a predetermined percent or more of the words extracted from the first display information and the words extracted from the second display information are identical, determination unit 23 may determine that the first display information and the second display information are identical.

In another example, when the first display information and the second display information are image information items, determination unit 23 may determine the sameness of at least one of a graphic or a character string extracted from the first display information and at least one of a graphic or a character string extracted from the second display information, according to the results of analysis by analyzer 22. For instance, when analyzer 22 extracts at least one of a graphic or a character string from each of the image information items, if the at least one of the graphic or the character string extracted from the first display information is identical to the at least one of the graphic or the character string extracted from the second display information or a predetermined percent or more of the at least one of the graphic or the character string extracted from the first display information and the at least one of the graphic or the character string extracted from the second display information are identical, determination unit 23 may determine that the first display information and the second display information are identical.

In still another example, determination unit 23 may also determine the sameness of the provider of the first display information and the provider of the second display information according to the results of analysis, by analyzer 22, of the headers of the first display information and the second display information. As illustrated in FIG. 4B, when analyzer 22 extracts the headers included in the first display information and the second display information, if the provider indicated by the header of the first display information and the provider indicated by the header of the second display information are identical, determination unit 23 may determine that the first display information and the second display information are identical.

In still another example, when analyzer 22 analyzes the time point at which the first display information was generated and the time point at which the second display information was generated, determination unit 23 may also determine, according to the results of analysis by analyzer 22, the sameness of the time point at which the first display information was generated and the time point at which the second display information was generated. For instance, when the traveling speed of vehicle 2 exceeds the legal speed, the first display information and the second display information are simultaneously generated. When the time point at which the first display information was generated and the time point at which the second display information was generated are identical, determination unit 23 may determine that the first display information and the second display information are identical.

In still another example, when analyzer 22 analyzes the display location of the first display information and the display location of the second display information, determination unit 23 may also determine, according to the results of analysis by analyzer 22, the sameness of the display location to display the first display information and the display location to display the second display information, the display locations being display locations on at least one display 30.

It should be noted that when analyzer 22 analyzes the first display information which is text information and extracts words and analyzes the second display information which is image information and extracts a character string, determination unit 23 may determine the sameness of the first display information and the second display information.

When determination unit 23 determines that the first display information and the second display information are identical (Yes in S13), display controller 24 obtains, from determination unit 23, the result of determination by determination unit 23, the first display information, and the second display information. Display controller 24 organizes the first display information and the second display information into one display information item and generates a video showing the one display information item which has undergone drawing processing. For instance, as illustrated in FIG. 5, the following case is assumed. The first display information indicates that "Traffic jam information was received from another vehicle. There is a traffic jam 10 km ahead." The second display information indicates that "Traffic jam information, Section: near XYZ IC, Cause: accident between vehicles, Length of traffic jam: 5 km." In this case, display controller 24 organizes the first display information and the second display information into one display information item and generates a video showing the display information, "Traffic jam information, Section: near XYZ IC (10 km ahead), Cause: accident between vehicles, Length of traffic jam: 5 km." In another example, the first display information is text information indicating that "There is an oncoming vehicle 50$m$ ahead, Caution when turning right", and the second display information is image information that includes a graphic indicating a sign and a character string indicating that "One oncoming vehicle 50$m$ ahead was detected." In this case, display controller 24 generates a video showing one display information item including the sign and the character string of "There is one oncoming vehicle 50$m$ ahead, Caution when turning right." Display controller 24 outputs, to predetermined display 30, the video showing the one display information item. Thus, display controller 24 can cause predetermined display 30 to display the one display information item.

Display 30 displays the obtained video showing the one display information item (S14). Display control device 20 ends the processing of the flowchart illustrated in FIG. 6.

Meanwhile, when determination unit 23 determines that the first display information and the second display information are not identical (No in S13), display controller 24 obtains, from determination unit 23, the result of determination by determination unit 23, the first display information, and the second display information. Display controller 24 generates videos showing display information items obtained by performing the drawing processing on the first display information and the second display information. Display controller 24 outputs the generated videos showing the display information items to corresponding displays 30 or corresponding display 30.

Display 30 displays the video showing the first display information. Display 30 may also display the second display information at a display location different from the display location of the first display information. Alternatively, another display 30 may display the video showing the second display information. In this way, at least one display 30 can separately display the video showing the first display information and the video showing the second display information (S15). Display control device 20 ends the processing of the flowchart illustrated in FIG. 6.

Advantageous Effects

Advantageous effects obtained from display control device 20, the display control method, and the program according to the embodiment are described below.

For instance, for conventional information generation devices, even if sensor information items received from sensors are identical, each of the identical sensor information items is displayed on a display. Thus, display control device 20 according to the embodiment includes analyzer 22 that obtains and analyzes first display information and second display information, the first display information being traffic information transmitted by first external device 11 present outside vehicle 2 including at least one display 30, the second display information being traffic information transmitted by second external device 12 present outside vehicle 2, the first display information and the second display information each being information to be displayed on at least one display 30, determination unit 23 that determines the sameness of the first display information and the second display information according to the results of analysis by analyzer 22, and display controller 24 that controls at least one display 30. Second external device 12 is different from first external device 11. When determination unit 23 determines that the first display information and the second display information are identical, display controller 24 causes a predetermined display of at least one display 30 to display one display information item based on the first display information and the second display information.

When the traffic information (first display information) is obtained from first external device 11 and the traffic information (second display information) is obtained from second external device 12, it is possible to determine the sameness of the two traffic information items obtained. When it is determined that the traffic information (first display information) and the traffic information (second display information) are identical, one display information item is displayed. Thus, it is possible to suppress display 30 from displaying each of the identical display information items.

Thus, even if the identical traffic information items (display information items) are obtained, it is possible to suppress each of the identical traffic information items from being displayed.

The display control method according to the embodiment includes obtaining and analyzing first display information and second display information, the first display information being traffic information transmitted by first external device 11 present outside vehicle 2 including at least one display 30, the second display information being traffic information transmitted by second external device 12 present outside vehicle 2, the first display information and the second display information each being information to be displayed on at least one display 30, second external device 12 being different from first external device 11, determining the sameness of the first display information and the second display information according to the results of analysis, controlling at least one display 30, and causing a predetermined display of at least one display 30 to display one display information item based on the first display information and the second display information, the causing being performed when the first display information and the second display information are determined to be identical.

By performing the display control method, advantageous effects similar to the advantageous effects described above can be obtained.

The program according to the embodiment is a program for causing a computer to perform the display control method.

By executing the program, advantageous effects similar to the advantageous effects described above can be obtained.

In display control device 20 according to the embodiment, the first display information and the second display information include text information. Analyzer 22 extracts a word from each of the first display information and the second display information by analyzing the first display information and the second display information. Determination unit 23 determines, according to the results of analysis by analyzer 22, the sameness of the word extracted from the first display information and the word extracted from the second display information.

Even if the first display information and the second display information are text information items, the sameness of the first display information and the second display information can be determined. Thus, when it is determined that the first display information and the second display information are identical, it is possible to suppress display 30 from displaying each of the identical display information items.

In display control device 20 according to the embodiment, analyzer 22 extracts at least one of a graphic or a character string from each of the first display information and the second display information by analyzing the first display information and the second display information. Determination unit 23 determines, according to the results of analysis by analyzer 22, the sameness of the at least one of the graphic or the character string extracted from the first display information and the at least one of the graphic or the character string extracted from the second display information.

Even if the first display information and the second display information are image information items, the sameness of the first display information and the second display information can be determined. Thus, when it is determined that the first display information and the second display information are identical, it is possible to suppress display 30 from displaying each of the identical display information items.

In display control device 20 according to the embodiment, analyzer 22 extracts the provider of the first display information and the provider of the second display information by analyzing the first display information and the second display information. Determination unit 23 determines, according to the results of analysis by analyzer 22, the sameness of the provider of the first display information and the provider of the second display information.

Since the providers of the first display information and the second display information can be analyzed, the sameness of the first display information and the second display information can be determined. Thus, when it is determined that the first display information and the second display information are identical, it is possible to suppress display 30 from displaying each of the identical display information items.

In display control device 20 according to the embodiment, by analyzing the first display information and the second display information, analyzer 22 extracts the time point at which the first display information was generated and the time point at which the second display information was generated. Determination unit 23 determines, according to the results of analysis by analyzer 22, the sameness of the time point at which the first display information was generated and the time point at which the second display information was generated.

Since the time point at which the first display information was generated and the time point at which the second display information was generated can be analyzed, the sameness of the first display information and the second display information can be determined. Thus, when it is determined that the first display information and the second display information are identical, it is possible to suppress display 30 from displaying each of the identical display information items.

In display control device 20 according to the embodiment, by analyzing the first display information and the second display information, analyzer 22 extracts a display location to display the first display information on at least one display 30 and a display location to display the second display information on at least one display 30. Determination unit 23 determines, according to the results of analysis by analyzer 22, the sameness of the display location to display the first display information and the display location to display the second display information, the display locations being display locations on at least one display 30.

Since it is possible to analyze the display location to display the first display information on display 30 and the display location to display the second display information on display 30, the sameness of the first display information and the second display information can be determined. Thus, when it is determined that the first display information and the second display information are identical, it is possible to suppress display 30 from displaying each of the identical display information items.

In display control device 20 according to the embodiment, analyzer 22 analyzes the first display information and the second display information by using an analysis algorithm of artificial intelligence. By using a determination algorithm of the artificial intelligence, determination unit 23 determines the sameness of the first display information and the second display information according to the results of analysis using the analysis algorithm by analyzer 22.

Thus, the first display information and the second display information can be analyzed using the analysis algorithm. In addition, the sameness of the first display information and the second display information can be determined using the determination algorithm, according to analysis results. That is, when the first display information and the second display information are input, the sameness of the first display information and the second display information can be determined.

In display control device 20 according to the embodiment, when determination unit 23 determines that the first display information and the second display information are identical, display controller 24 organizes the first display information and the second display information into the one display information item and causes predetermined display 30 to display the one display information item.

When it is determined that the traffic information (first display information) and the traffic information (second display information) are identical, the traffic information (first display information) and the traffic information (second display information) can be organized into one traffic information item. Since predetermined display 30 is caused to display the one display information item, it is possible to suppress display 30 from displaying each of the identical display information items.

Variation 1 of Embodiment

In Variation 1, when display 30 displaying display information further obtains display information, display 30 is caused to continue to display the currently displayed display information or caused to display the currently displayed display information and the further obtained display information at different display locations. In this respect, Variation 1 differs from the embodiment. Unless otherwise stated, the others described in Variation 1 are similar to these described in the embodiment. Identical elements are assigned the same reference symbol, and detailed explanations for the identical elements are omitted.

[Configuration and Function]

In-vehicle system 1 according to Variation 1 is described.

When obtaining traffic information from an external device (e.g., first external device 11), display control device 20 according to Variation 1 displays the traffic information (e.g., first display information) on display 30. Then, display control device 20 obtains traffic information (second display information) from another external device (e.g., second external device 12). At this time, display 30 may be displaying the first display information as a video.

Thus, determination unit 23 obtains, from analyzer 22, the second display information and the result of analysis of the second display information and obtains, from memory 25, the result of analysis of the first display information currently displayed on display 30. Determination unit 23 determines the sameness of the first display information and the second display information according to the result of analysis of the second display information by analyzer 22 and the result of analysis of the first display information. When determination unit 23 determines that the first display information and the second display information are identical, display controller 24 causes display 30 to continue to display the first display information. In other words, display controller 24 does not have to display the further obtained second display information on display 30. That is, even if the second display information is further obtained, as the first display information, the same content as the second display information, is being displayed, display controller 24 can cause any of displays 30 not to display the second display information. Thus, display 30 can continue to display the first display information.

For instance, the display information currently displayed on display 30, the results of analysis by analyzer 22, and the tag of the display information are stored in memory 25.

Operation Example

An operation example in display control device 20, a display control method, and a program according to Variation 1 is described below. The operation example is described with reference to FIG. 7.

Figure 7:
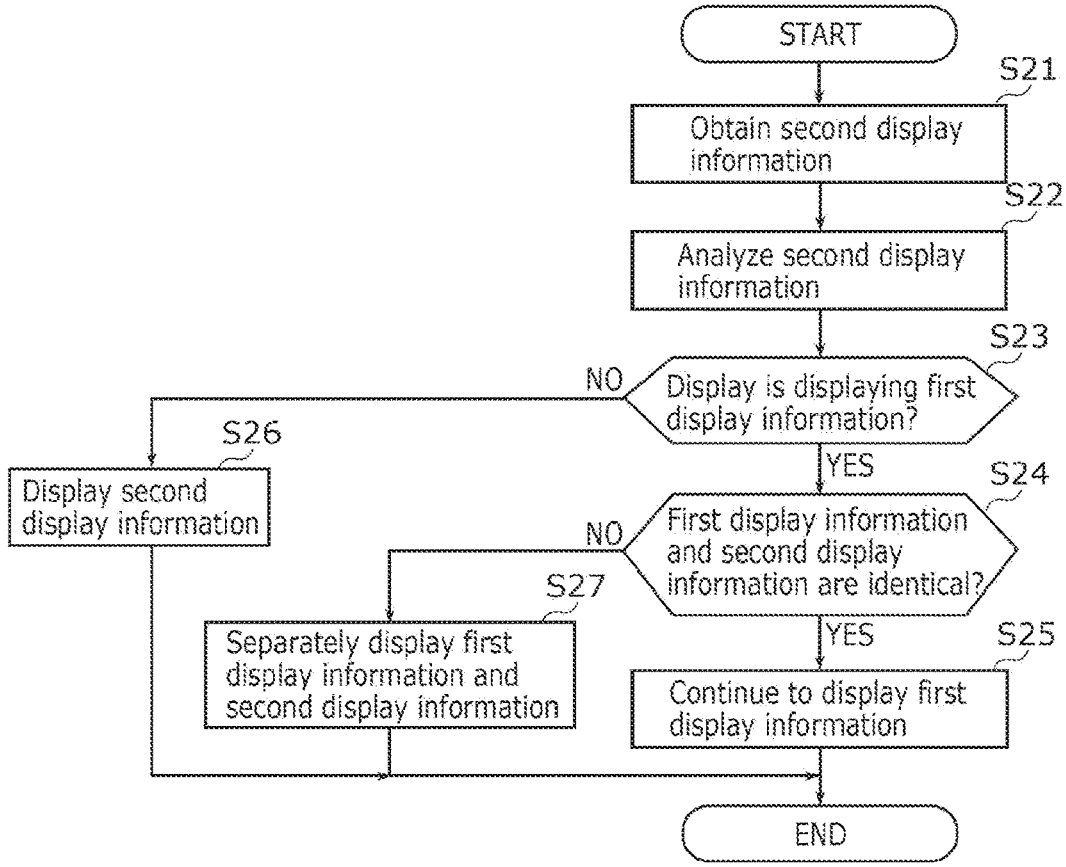
FIG. 7 is a flowchart illustrating an example of operation of a display control device according to Variation 1 of the embodiment.

FIG. 7 is a flowchart illustrating an example of operation of display control device 20 according to Variation 1 of the embodiment.

The operation example assumes a processing operation performed when display control device 20 obtains the second display information in a state in which display 30 is displaying the first display information. It should be noted that (i) a processing operation performed when display control device 20 obtains the first display information in a state in which display 30 is displaying the second display information and (ii) a processing operation performed when only the first display information is obtained are similar to the assumed processing operation. Thus, in the operation example, explanations for the processing operations are omitted.

Analyzer 22 obtains, from input and output unit 21, the second display information transmitted by second external device 12 (S21).

Analyzer 22 analyzes the obtained second display information (S22). After analyzing the first display information and the second display information, analyzer 22 generates tags for the analyzed first display information and second display information. Analyzer 22 stores the analysis results and the generated tags in memory 25. In addition, analyzer 22 outputs, to determination unit 23, the first display information, the second display information, the analysis results, and the tags.

Determination unit 23 determines whether display 30 is displaying the first display information (S23).

When display 30 is not displaying the first display information (No in S23), determination unit 23 outputs the second display information to display controller 24. Display controller 24 obtains the second display information from determination unit 23. Display controller 24 generates a video showing display information obtained by performing drawing processing for the second display information. Display controller 24 outputs the generated video showing the display information to corresponding display 30.

Display 30 displays the video showing the second display information (S26). Display control device 20 ends the processing of the flowchart illustrated in FIG. 7.

Meanwhile, when display 30 is displaying the first display information (Yes in S23), determination unit 23 obtains, from memory 25, the result of analysis of the first display information displayed on display 30. Determination unit 23 determines the sameness of the further obtained second display information and the first display information currently displayed on display 30 according to the result of analysis of the second display information, obtained in step S22 and the result of analysis of the first display information (S24).

When determination unit 23 determines that the first display information and the second display information are identical (Yes in S24), display controller 24 obtains the result of determination by determination unit 23 from determination unit 23. Display controller 24 causes display 30 to continue to display the currently displayed first display information (S25). In other words, display controller 24 causes any of displays 30 not to display the further obtained second display information.

Meanwhile, when determination unit 23 determines that the first display information and the second display information are not identical (No in S24), display controller 24 obtains, from determination unit 23, the result of determination by determination unit 23 and the second display information. Display controller 24 generates the video showing the second display information which has undergone the drawing processing. Display controller 24 outputs the generated video showing the second display information to corresponding display 30.

Display 30 displays the video showing the second display information. In this way, at least one display 30 can separately display the video showing traffic information corresponding to the first display information and the video showing traffic information corresponding to the second display information (S27). Display control device 20 ends the processing of the flowchart illustrated in FIG. 7.

Advantageous Effects

Advantageous effects obtained from display control device 20, the display control method, and the program according to Variation 1 are described below.

As described above, in display control device 20 according to Variation 1, in a state in which display controller 24 is causing display to display the first display information, when display control device 20 further obtains the second display information, analyzer 22 analyzes the further obtained second display information. According to the results of analysis by analyzer 22, determination unit 23 determines the sameness of the further obtained second display information and the first display information currently displayed on display 30. When determination unit 23 determines that the first display information and the second display information are identical, display controller 24 causes display 30 to continue to display the currently displayed first display information.

In a state in which display 30 is displaying traffic information (e.g., first display information), display control device 20 further obtains traffic information (e.g., second display information). Even in this case, when it is determined that the first display information and the second display information are identical, display control device 20 can cause display 30 to continue to display the currently displayed first display information.

Variation 2 of Embodiment

In Variation 2, traffic information is displayed according to the order of priority. In this respect, Variation 2 differs from the embodiment. Unless otherwise stated, the others described in Variation 2 are similar to theses described in the embodiment. Identical elements are assigned the same reference symbol, and detailed explanations for the identical elements are omitted.

[Configuration and Function]

In-vehicle system 1 according to Variation 2 is described. When for instance obtaining first display information from first external device 11, display control device 20 according to Variation 2 displays the first display information on display 30. Then, display control device 20 obtains second display information from another external device, second external device 12. At this time, display 30 may be displaying the first display information as a video. Here, the order of priority may be preset for first external device 11 and second external device 12. The order of priority may be preset by a user or may be set so that information from a reliable external device is preferentially displayed according to the situation. When the information from the reliable external device takes priority, priority may be given according to the surrounding environment of vehicle 2. For instance, in bad weather, information from an infrastructure sensor may be preferentially displayed, and when the weather is not bad, information from, for example, another vehicle may be preferentially displayed.

Determination unit 23 obtains, from analyzer 22, the second display information and the result of analysis of the second display information. In addition, determination unit 23 obtains, from memory 25, the result of analysis of the first display information currently displayed on display 30. Determination unit 23 determines the sameness of the first display information and the second display information according to the results of analysis of second display information and the first display information by analyzer 22.

When determination unit 23 determines that the first display information and the second display information are identical, if first external device 11 is given a higher priority than that of second external device 12, display controller 24 causes display 30 to continue to display the first display information from first external device 11. In other words, display controller 24 causes any of displays 30 not to display the second display information further obtained from second external device 12. That is, even if the second display information is further obtained, as the first display information having a higher priority is being displayed, display controller 24 can cause displays 30 not to display the second display information. This can suppress display 30 from displaying each of similar display information items.

When determination unit 23 determines that the first display information and the second display information are identical, if first external device 11 is given a lower priority than that of second external device 12, display controller 24 causes display 30 to display the second display information further obtained from second external device 12, instead of the first display information from first external device 11. That is, when obtaining the second display information from second external device 12 of a higher priority, display controller 24 preferentially displays the second display information transmitted from second external device 12 of a higher priority. This enables display 30 to display the second display information transmitted from second external device 12 of a higher priority.

Operation Example

An operation example is described with reference to FIG. 8.

Figure 8:
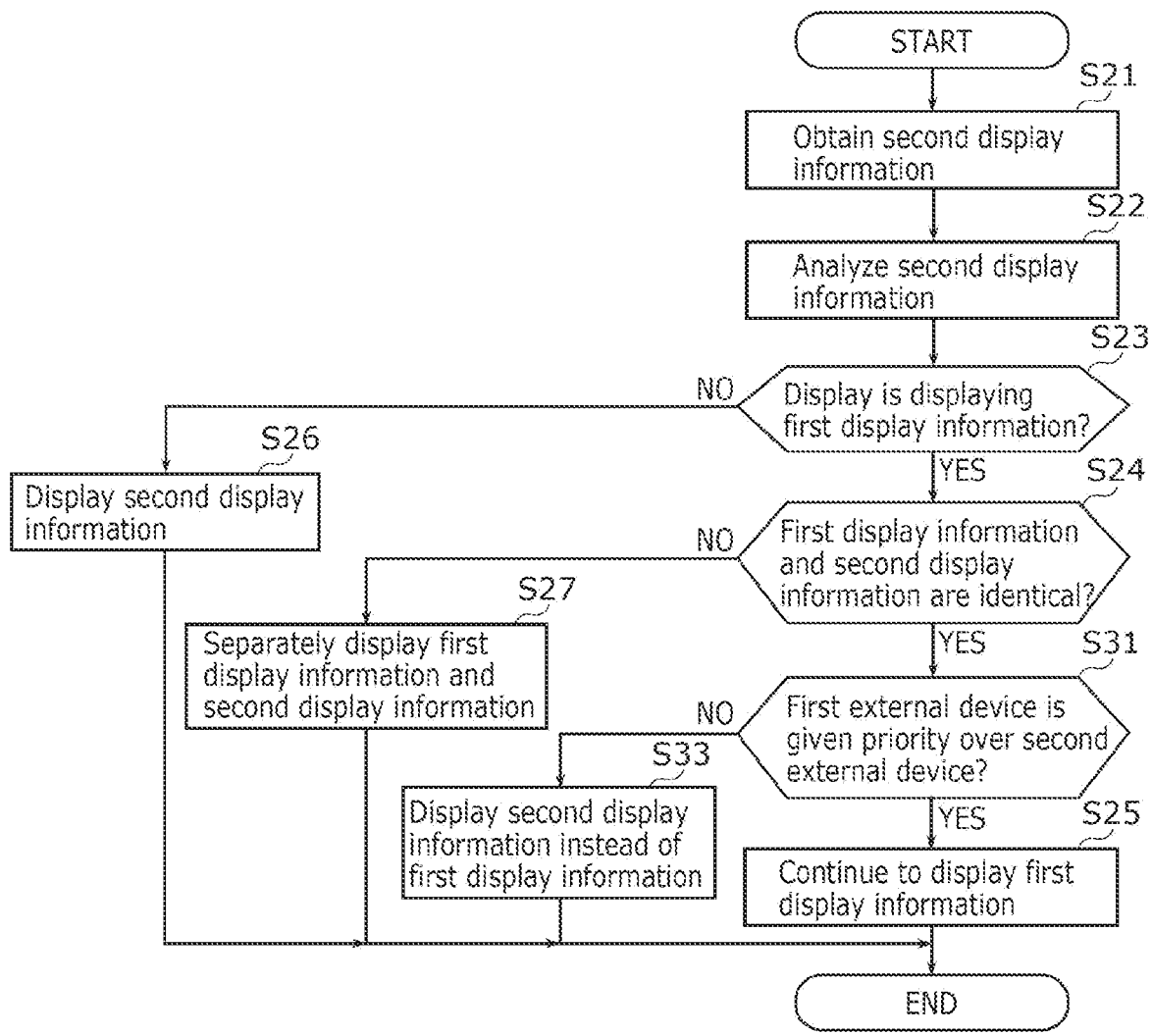
FIG. 8 is a flowchart illustrating an example of operation of a display control device according to Variation 2 of the embodiment.

FIG. 8 is a flowchart illustrating an example of operation of display control device 20 according to Variation 2 of the embodiment.

The operation example assumes a processing operation performed in the following case: in a state in which display 30 is displaying the first display information, when display control device obtains the second display information, the first display information and/or the second display information is displayed on display 30 according to the order of priority. It should be noted that (i) a processing operation performed when display control device 20 obtains the first display information in a state in which display 30 is displaying the second display information and (ii) a processing operation performed when only the first display information is obtained are similar to the assumed processing operation. In the operation example, explanations for the processing operations are omitted. In addition, the identical processing operations in FIGS. 7 and 8 are assigned the same reference symbol, and explanations are appropriately omitted.

Steps S21 to S24 are performed. When determination unit 23 determines that the first display information and the second display information are identical (Yes in S24), display controller 24 determines whether first external device 11 is given a higher priority than that of second external device 12 (S31).

When determination unit 23 determines that first external device 11 is given a higher priority than that of second external device 12 (Yes in S31), display controller 24 causes display 30 to continue to display the currently displayed first display information (S25). Display control device 20 ends the processing of the flowchart illustrated in FIG. 8.

When determination unit 23 determines that first external device 11 is given a lower priority than that of second external device 12 (No in S31), display controller 24 causes display 30 to display the further obtained second display information instead of the currently displayed first display information (S33). For instance, information from a reliable external device, such as an infrastructure sensor, can be preferentially displayed. Display control device 20 ends the processing of the flowchart illustrated in FIG. 8.

Advantageous Effects

Advantageous effects obtained from display control device 20, a display control method, and a program according to Variation 2 are described below.

As described above, in display control device 20 according to Variation 2, the order of priority is preset for first external device 11 and second external device 12. In a state in which display controller 24 is causing display 30 to display the first display information, when display control device 20 further obtains the second display information, analyzer 22 analyzes the further obtained second display information. According to the results of analysis by analyzer 22, determination unit 23 determines the sameness of the further obtained second display information and the first display information currently displayed on display 30. Consider the case in which determination unit 23 determines that the first display information and the second display information are identical. In this case, if first external device 11 is given a higher priority than that of second external device 12, display controller 24 causes display 30 to continue to display the first display information from first external device 11. Meanwhile, if first external device 11 is given a lower priority than that of second external device 12, display controller 24 causes display 30 to display the second display information from second external device 12 instead of the first display information from first external device 11.

Thus, even if traffic information (e.g., second display information) is further obtained, when the first display information and the second display information are identical and first external device 11 is given a higher priority than that of second external device 12, it is possible to cause display 30 to continue to display the currently displayed first display information.

Thus, even if traffic information (e.g., second display information) is further obtained, when the first display information and the second display information are identical and first external device 11 is given a lower priority than that of second external device 12, it is possible to cause display 30 to display the second display information instead of the first display information. Accordingly, the traffic information obtained from the more reliable external device can be preferentially displayed on display 30.

Variation 3 of Embodiment

In Variation 3, an original data list for organizing original data into one display information item is stored in memory 25. In this respect, Variation 3 differs from the embodiment. Unless otherwise stated, the others described in Variation 3 are similar to these described in the embodiment. Identical elements are assigned the same reference symbol, and detailed explanations for the identical elements are omitted.

[Configuration and Function]

Display control device 20, a display control method, and a program according to Variation 3 are described with reference to FIG. 9.

Figure 9:
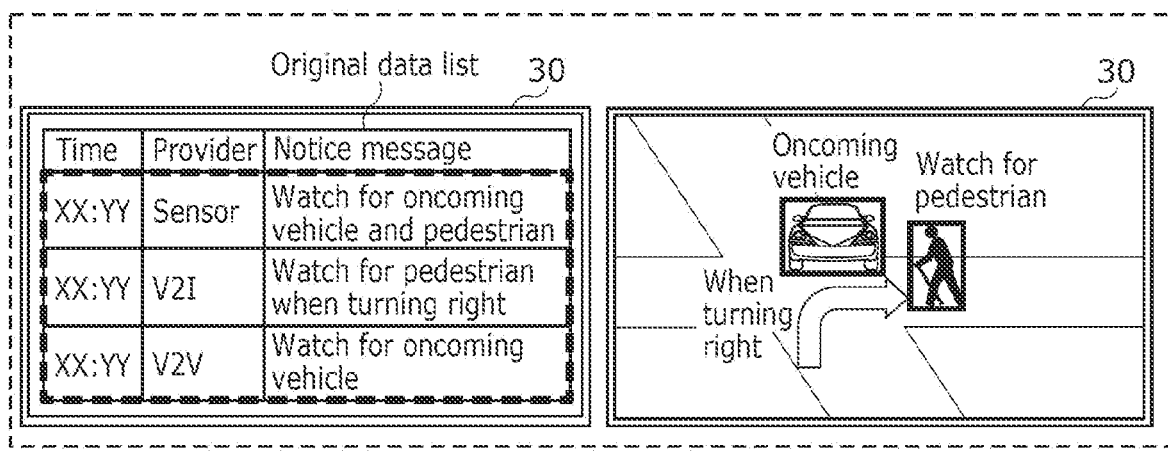
FIG. 9 illustrates an original data list displayed on a display.

FIG. 9 illustrates an original data list displayed on display 30.

In Variation 3, when two or more display information items obtained by display control device 20 are identical, display controller 24 organizes the traffic information items into one display information item and generates the original data list for organizing the original data into the one display information item. Display controller 24 stores, in memory 25, the display information item to be displayed and the generated original data list. Display controller 24 can cause display 30 to display the original data list stored in memory 25. Display controller 24 can cause display 30 to display the original data list which is a color classified list illustrated in a dashed line and another display 30 to display a video to which a character string in the notice message of the original data list is added. The original data list and the video may be displayed on one display 30 or may be separately displayed on different displays 30. The original data list is a list into which two or more traffic information items are gathered and includes, for example, the time point at which each display information item was generated, the provider of the display information item, and a notice message.

Advantageous Effects

Advantageous effects obtained from display control device 20, the display control method, and the program according to Variation 3 are described below.

As described above, display control device 20 according to Variation 3 includes memory 25. When determination unit 23 determines that the first display information and the second display information are identical, display controller 24 stores, in memory 25, the original data list for generating the one display information item from the display information items. Then, display controller 24 causes at least one display 30 to display the original data list.

Thus, it is possible to store the original data list in memory 25, which enables the developer of display control device 20 to analyze a determination result indicating that display information items are identical. Thus, the developer can advance the new development on the basis of the original data list.

Other Variations

The display control devices, the display control methods, and the programs according to the present disclosure are described above on the basis of the embodiment and Variations 1 to 3 of the embodiment. However, the present disclosure is not limited to the descriptions in the embodiment and Variations 1 to 3 of the embodiment. The present disclosure may include, within the spirit of the present disclosure, one or more embodiments made by making various changes envisioned by those skilled in the art to the above embodiment and Variations 1 to 3 of the embodiment.

For instance, the analyzer, the determination unit, the display controller, and other elements included in each of the display control devices, the display control methods, and the programs according to the embodiment and Variations 1 to 3 of the embodiment are typically embodied as large-scale integrations (LSIs), which are integrated circuits. The elements may be made as individual chips, or a part or all of the elements may be incorporated into one chip.

In addition, circuit integration is achieved not only by an LSI but also by a dedicated circuit or a general-purpose processor. A field programmable gate array (FPGA) programmable after manufacturing of an LSI or a reconfigurable processor in which the connections and settings of circuit cells inside an LSI are reconfigurable may be used.

It should be noted that in the embodiment and Variations 1 to 3 of the embodiment, each of the structural elements may be dedicated hardware or may be caused to function by executing a software program suitable for the structural element. The structural element may be caused to function by a program executer, such as a CPU or a processor, reading and executing a software program stored in a recording medium, such as a hard disk or semiconductor memory.

In addition, all the numbers used in the above descriptions are provided as examples to specifically explain the present disclosure. In the embodiment in the present disclosure and Variations 1 to 3 of the embodiment, the numbers are provided for purposes of illustration and not limitation.

In addition, the configuration of the functional blocks illustrated in each block diagram is a mere example. Two or more functional blocks may be incorporated into one functional block. One functional block may be divided into more than one functional block. A part of the function may be transferred from one functional block to another functional block. The same hardware or software may process, in parallel or on a time-sharing basis, the functions of two or more functional blocks having similar functions.

The order in which the steps in each flowchart are performed is described as an example to specifically explain the present disclosure. The steps may be performed in a different order. In addition, a part of the steps and another step may be performed simultaneously (in parallel).

The characteristics of the display control devices, the display control methods, and the programs described on the basis of the embodiment and Variations 1 to 3 of the embodiment are described below.

[Technique 1]
A display control device including:
an analyzer that obtains and analyzes first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display;
a determination unit that determines the sameness of the first display information and the second display information according to the results of analysis by the analyzer; and
a display controller that controls the at least one display,
in which the second external device is different from the first external device, and
when the determination unit determines that the first display information and the second display information are identical, the display controller causes a predetermined display of the at least one display to display one display information item based on the first display information and the second display information.

[Technique 2]
The display control device according to technique 1, in which the first display information and the second display information include text information,
the analyzer extracts a word from each of the first display information and the second display information by analyzing the first display information and the second display information, and
the determination unit determines, according to the results of analysis by the analyzer, the sameness of the word extracted from the first display information and the word extracted from the second display information.

[Technique 3]
The display control device according to technique 1,
in which the analyzer extracts at least one of a graphic or a character string from each of the first display information and the second display information by analyzing the first display information and the second display information, and
the determination unit determines, according to the results of analysis by the analyzer, the sameness of the at least one of the graphic or the character string extracted from the first display information and the at least one of the graphic or the character string extracted from the second display information.

[Technique 4]
The display control device according to technique 1,
in which the analyzer extracts the provider of the first display information and the provider of the second display information by analyzing the first display information and the second display information, and
the determination unit determines, according to the results of analysis by the analyzer, the sameness of the provider of the first display information and the provider of the second display information.

[Technique 5]
The display control device according to technique 1,
in which by analyzing the first display information and the second display information, the analyzer extracts the time point at which the first display information was generated and the time point at which the second display information was generated, and
the determination unit determines, according to the results of analysis by the analyzer, the sameness of the time point at which the first display information was generated and the time point at which the second display information was generated.

[Technique 6]
The display control device according to technique 1,
in which by analyzing the first display information and the second display information, the analyzer extracts a display location to display the first display information on the at least one display and a display location to display the second display information on the at least one display, and
the determination unit determines, according to the results of analysis by the analyzer, the sameness of the display location to display the first display information and the display location to display the second display information, the display locations being display locations on the at least one display.

[Technique 7]
The display control device according to technique 1,
in which the analyzer analyzes the first display information and the second display information by using an analysis algorithm of artificial intelligence, and
by using a determination algorithm of the artificial intelligence, the determination unit determines the sameness of the first display information and the second display information according to the results of analysis using the analysis algorithm by the analyzer.

[Technique 8]

The display control device according to one of techniques 1 to 7,
in which when the determination unit determines that the first display information and the second display information are identical, the display controller organizes the first display information and the second display information into the one display information item and causes the predetermined display to display the one display information item.

[Technique 9]

The display control device according to one of techniques 1 to 7,
in which in a state in which the display controller is causing a display that is one of the at least one display to display the first display information, when the display control device further obtains the second display information,
the analyzer analyzes the second display information further obtained,
the determination unit determines the sameness of the second display information further obtained and the first display information currently displayed on the display, according to the results of analysis, by the analyzer, of the second display information further obtained and the first display information currently displayed, and
when the determination unit determines that the second display information further obtained is identical to the first display information currently displayed, the display controller causes the display to continue to display the first display information currently displayed.

[Technique 10]

The display control device according to one of techniques 1 to 7,
in which the order of priority is preset for the first external device and the second external device,
in a state in which the display controller is causing a display that is one of the at least one display to display the first display information, when the display control device further obtains the second display information,
the analyzer analyzes the second display information further obtained,
the determination unit determines the sameness of the second display information further obtained and the first display information currently displayed on the display, according to the results of analysis, by the analyzer, of the second display information further obtained and the first display information currently displayed, and
when the determination unit determines that the second display information further obtained is identical to the first display information currently displayed,
when the first external device is given a priority higher than the priority of the second external device, the display controller further causes the display to continue to display the first display information, and
when the first external device is given a priority lower than the priority of the second external device, the display controller further causes the display to display the second display information from the second external device instead of the first display information from the first external device.

[Technique 11]

The display control device according to one of techniques 1 to 10, including:
memory,
in which when the determination unit determines that the first display information and the second display information are identical, the display controller stores, in the memory, an original data list for generating the one display information item and causes the at least one display to display the original data list.

[Technique 12]

A display control method including:
obtaining and analyzing first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display, the second external device being different from the first external device;
determining the sameness of the first display information and the second display information according to the results of analysis;
controlling the at least one display; and
causing a predetermined display of the at least one display to display one display information item based on the first display information and the second display information, the causing being performed when the first display information and the second display information are determined to be identical.

[Technique 13]

A non-transitory computer-readable recording medium having recorded thereon a program for causing a computer to perform the display control method according to technique 12.

While an embodiment has been described herein above, it is to be appreciated that various changes in form and detail may be made without departing from the spirit and scope of the present disclosure as presently or hereafter claimed. It should be noted that the present disclosure includes one or more embodiments obtained by making various changes to the embodiment and Variations 1 to 3 of the embodiment and one or more embodiments obtained by optionally combining, within the scope of the present disclosure, some of the structural elements and functions in the embodiment and Variations 1 to 3 of the embodiment.

Further Information about Technical Background to this Application

The disclosure of the following patent application including specification, drawings, and claims is incorporated herein by reference in their entirety: Japanese Patent Application No. 2022-129180 filed on Aug. 15, 2022.

INDUSTRIAL APPLICABILITY

The present disclosure can be used in, for example, a vehicle equipped with displays and a device and a system which are other than the vehicle.

The invention claimed is:

1. A display control device comprising:
circuitry configured to:
obtain and analyze first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display;

determine whether the first display information and the second display information are identical according to results of the analysis; and control the at least one display, wherein the second external device is different from the first external device, and when the circuitry determines that the first display information and the second display information are identical, the circuitry causes a predetermined display of the at least one display to display one display information item based on the first display information and the second display information to suppress the predetermined display from displaying each of similar display information items.

2. The display control device according to claim 1,
wherein the first display information and the second display information include text information,
the circuitry extracts a word from each of the first display information and the second display information by analyzing the first display information and the second display information, and
the circuitry determines, according to the results of analysis by the circuitry, whether the word extracted from the first display information and the word extracted from the second display information are identical.

3. The display control device according to claim 1,
wherein the circuitry extracts at least one of a graphic or a character string from each of the first display information and the second display information by analyzing the first display information and the second display information, and
the circuitry determines, according to the results of analysis by the circuitry, whether the at least one of the graphic or the character string extracted from the first display information and the at least one of the graphic or the character string extracted from the second display information are identical.

4. The display control device according to claim 1,
wherein the circuitry extracts a provider of the first display information and a provider of the second display information by analyzing the first display information and the second display information, and
the circuitry determines, according to the results of analysis by the circuitry, whether the provider of the first display information and the provider of the second display information are identical.

5. The display control device according to claim 1,
wherein by analyzing the first display information and the second display information, the circuitry extracts a time point at which the first display information was generated and a time point at which the second display information was generated, and
the circuitry determines, according to the results of analysis by the circuitry, whether the time point at which the first display information was generated and the time point at which the second display information was generated are identical.

6. The display control device according to claim 1,
wherein by analyzing the first display information and the second display information, the circuitry extracts a display location to display the first display information on the at least one display and a display location to display the second display information on the at least one display, and
the circuitry determines, according to the results of analysis by the circuitry, whether the display location to display the first display information and the display location to display the second display information are identical, the display locations being display locations on the at least one display.

7. The display control device according to claim 1,
wherein the circuitry analyzes the first display information and the second display information by using an analysis algorithm of artificial intelligence, and
by using a determination algorithm of the artificial intelligence, the circuitry determines the whether the first display information and the second display information are identical according to results of analysis using the analysis algorithm by the circuitry.

8. The display control device according to claim 1,
wherein when the circuitry determines that the first display information and the second display information are identical, the circuitry organizes the first display information and the second display information into the one display information item and causes the predetermined display to display the one display information item.

9. The display control device according to claim 1,
wherein in a state in which the circuitry is causing a display that is one of the at least one display to display the first display information, when the display control device further obtains the second display information,
the circuitry analyzes the second display information further obtained,
the circuitry determines whether the second display information further obtained and the first display information currently displayed on the display are identical, according to results of analysis, by the circuitry, of the second display information further obtained and the first display information currently displayed, and
when the circuitry determines that the second display information further obtained is identical to the first display information currently displayed, the circuitry causes the display to continue to display the first display information currently displayed.

10. The display control device according to claim 1,
wherein an order of priority is preset for the first external device and the second external device,
in a state in which the circuitry is causing a display that is one of the at least one display to display the first display information, when the display control device further obtains the second display information,
the circuitry analyzes the second display information further obtained,
the circuitry determines whether the second display information further obtained and the first display information currently displayed on the display are identical, according to results of analysis, by the circuitry, of the second display information further obtained and the first display information currently displayed, and
when the circuitry determines that the second display information further obtained is identical to the first display information currently displayed, when the first external device is given a priority higher than a priority of the second external device, the circuitry further causes the display to continue to display the first display information, and when the first external device is given a priority lower than the priority of the second external device, the circuitry further causes the display to display the second display information from the second external device instead of the first display information from the first external device.

11. The display control device according to claim 1, further comprising:

memory, wherein when the circuitry determines that the first display information and the second display information are identical, the circuitry stores, in the memory, an original data list for generating the one display information item and causes the at least one display to display the original data list.

12. A display control method comprising:

obtaining and analyzing first display information and second display information, the first display information being traffic information transmitted by a first external device present outside a vehicle including at least one display, the second display information being traffic information transmitted by a second external device present outside the vehicle, the first display information and the second display information each being information to be displayed on the at least one display, the second external device being different from the first external device;

determining whether the first display information and the second display information are identical according to results of analysis;

controlling the at least one display; and causing a predetermined display of the at least one display to display one display information item based on the first display information and the second display information, the causing being performed when the first display information and the second display information are determined to be identical to suppress the predetermined display from displaying each of similar display information items.

13. A non-transitory computer-readable recording medium having recorded thereon program instructions for causing a computer to perform the display control method according to claim 12.

* * * * *